United States Patent [19]

Drewes et al.

[11] Patent Number: 5,492,949
[45] Date of Patent: Feb. 20, 1996

[54] STABILIZED POLYVINYL CHLORIDE

[75] Inventors: Rolf Drewes, Lindenfels; Markus Kolb, Plankstadt; Karl Kuhn, Lautertal; Wolfgang Wehner, Ober-Ramstadt, all of Germany

[73] Assignee: Ciba-Geigy Corporation, Tarrytown, N.Y.

[21] Appl. No.: 226,620

[22] Filed: Apr. 12, 1994

[30] Foreign Application Priority Data

Apr. 16, 1993 [CH] Switzerland ............. 1171935

[51] Int. Cl.⁶ ................................................. C08K 5/15
[52] U.S. Cl. ............. 524/114; 524/399; 524/420; 524/432; 524/434; 524/425
[58] Field of Search ..................... 524/399, 434, 524/432, 420, 114, 425; 523/435

[56] References Cited

U.S. PATENT DOCUMENTS

| | | | |
|---|---|---|---|
| 2,795,565 | 6/1957 | Newey | 260/30.6 |
| 3,247,155 | 4/1966 | Frank et al. | 524/114 |
| 3,356,630 | 12/1967 | Vona et al. | 524/114 |
| 3,446,765 | 5/1969 | Pryer | 524/425 |
| 3,448,067 | 6/1969 | Penneck | 524/114 |
| 3,479,309 | 11/1969 | Hecker et al. | 524/114 |
| 3,499,866 | 3/1970 | Schwab | 524/114 |
| 3,575,905 | 4/1971 | Rhodes | 524/114 |
| 3,928,267 | 12/1975 | Rhodes et al. | 260/23 |
| 3,936,413 | 2/1976 | Wurmb | 524/420 |
| 4,117,029 | 9/1978 | Kitano | 260/836 |
| 4,123,400 | 10/1978 | Gay | 524/114 |
| 4,584,241 | 4/1986 | Choi et al. | 428/379 |
| 5,141,980 | 8/1992 | Ranceze et al. | 524/436 |
| 5,350,785 | 9/1994 | Sander et al. | 524/450 |

FOREIGN PATENT DOCUMENTS

| | | |
|---|---|---|
| 1114975 | 4/1956 | France . |
| 2247502 | 11/1973 | France . |
| 3402408 | 7/1985 | Germany . |
| 484174 | 2/1973 | Japan . |
| 1496865 | 1/1978 | United Kingdom . |

OTHER PUBLICATIONS

Rudolph Deanin et al "Synergistic . . . Chloride"—Polymer Engineering & Science (Mar. 1973), vol. 13, No. 2, 96–101.
Chevussus, *The Stabilization of Polyvinyl Chloride*, 42, 173–175 (1963).
R. E. Lally et al "Stabilization of Polyvinyl chloride"—Modern Plastics (Dec. 1949) 111,112,114,116,156–162.
Thinius, Stabilisierung und Alterung von Plastwerkstoffen, 1969, Akademie–Verlag, Berlin pp. 262–267.
Patent Abstracts of Japan, vol. 15, No. 337 (C–862) (4865).
Derwent Abst. 85–184811[31] (1985).

*Primary Examiner*—Veronica P. Hoke
*Attorney, Agent, or Firm*—Luther A. R. Hall; Michele A. Kovaleski

[57] ABSTRACT

Use of an inorganic or organic zinc compound and a terminal epoxide compound, optionally with chalk, gives a high level of stabilization of PVC.

17 Claims, No Drawings

STABILIZED POLYVINYL CHLORIDE

The invention relates to stabilized polyvinyl chloride (PVC), to stabilizer mixtures, to a process for the preparation of stabilized PVC, and to the use of stabilized PVC.

In addition to compounds of tin and lead, PVC can also be stabilized using fatty acid salts also termed metal soaps, where the metals are usually barium, cadmium, zinc or calcium. In view of the various stabilization properties (initial colour and thermal stability), balanced stabilization is achieved by using in each case a combination of two different metal soaps, for example barium and cadmium soaps. In order to avoid compounds containing barium, lead or cadmium, calcium and zinc soaps have also been proposed; cf., for example, "Plastics Additives", edited by H. Gächter and H. Müller, Hanser Verlag, 3rd Edition, 1990, pages 287–295 and Kunststoff Handbuch PVC, Volumes 1 and 2, Beck/Braun, Carl Hanser Verlag.

It has furthermore been proposed, inter alia, to employ an epoxy compound, in particular epoxidized soybean oil as costabilizer for PVC; cf., for example, "Plastics Additives", edited by H. Gächter and H. Müller, Hanser Verlag, 3rd Edition, 1990, pages 303–4, and U.S. Pat. No. 3,928,267. For chlorinated polyvinyl chloride, the use of glycidyl ethers of novolak resins as stabilizer has also been described, for example in DE 34 02 408.

However, there continues to be a demand for stabilized PVC in which the stabilizers used are physiologically acceptable and at the same time enable a high level of stabilization. In particular, stabilizers containing barium, lead or cadmium should be avoided.

It has now been found that PVC stabilized by means of a mixture of an inorganic or organic zinc compound and a terminal epoxide has excellent long-term stability with a good initial colour and colour retention. Surprisingly, the PVC stabilized according to the invention satisfies the high demands otherwise only satisfied by PVC stabilized by means of compounds of barium, lead or cadmium. Moreover, the stabilization according to the invention is achieved without the addition of calcium soaps; indeed, their addition is generally undesired, since it does not result in the improvement in stability which is usually expected.

The invention therefore relates to stabilized PVC comprising (a) PVC, (b) an inorganic or organic zinc compound and (c) a terminal epoxide compound. It preferably contains no compounds of barium, lead or cadmium.

For the purposes of the present invention, (a) PVC is also taken to mean copolymers or graft polymers of PVC with polymerizable compounds, such as acrylonitrile, vinyl acetate or ABS, and covers suspension, bulk or emulsion polymers. However, PVC for the purposes of the present invention does not include post-chlorinated PVC. Preference is given to PVC as a suspension, bulk or emulsion polymer, also in combination with polyacrylates.

Preference is given to stabilized PVC, as described above, in which (b) is at least one inorganic zinc compound, for example zinc oxide, hydroxide, chloride or sulfide, or superbasic zinc oxide/hydroxide addition compounds, or an organic zinc compound from the series consisting of aliphatic, saturated $C_2$–$C_{22}$carboxylates, aliphatic, unsaturated $C_3$–$C_{22}$carboxylates, aliphatic $C_2$–$C_{22}$carboxylates which are substituted by at least one OH group, cyclic and bicyclic carboxylates having 5–22 carbon atoms, phenyl carboxylates which are unsubstituted, are substituted by at least one OH group and/or are $C_1$–$C_{16}$alkyl-substituted, naphthyl carboxylates which are unsubstituted, are substituted by at least one OH group and/or are $C_1$–$C_{16}$alkyl-substituted, phenyl-$C_1$–$C_{16}$alkyl carboxylates, naphthyl-$C_1$–$C_{16}$alkyl carboxylates, or unsubstituted or $C_1$–$C_{12}$alkyl-substituted phenolates.

Examples which may be mentioned by name are the zinc salts of monovalent carboxylic acids, such as acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid; zinc salts of monoesters of divalent carboxylic acids, such as oxalic acid, malonic acid, succinic acid, glutaric acid, adipic acid, fumaric acid, talloleic acid, pentane-1,5-dicarboxylic acid, hexane-1,6-dicarboxylic acid, heptane-1,7-dicarboxylic acid, octane-1,8-dicarboxylic acid, phthalic acid, isophthalic acid, terephthalic acid and hydroxyphthalic acid; and diesters or triesters of trivalent or tetravalent carboxylic acids, such as hemimellitic acid, trimellitic acid, pyromellitic acid and citric acid.

Preference is given to compositions as described above in which (b) is an organic zinc compound, in particular an organic zinc carboxylate of a carboxylic acid having 7 to 18 carbon atoms (zinc soaps), for example benzoates or alkanoates, preferably stearate, oleate, laurate, palmitate, hydroxystearates, dihydroxystearates or 2-ethylhexanoate. Particular preference is given to stearate, oleate and p-tert-butylbenzoate.

If desired, a mixture of zinc compounds having different structures can also be employed.

The inorganic or organic zinc compounds can be used in an amount of, for example, 0.001 to 5 parts by weight, preferably from 0.01 to 5 parts by weight, particularly preferably from 0.01 to 3 parts by weight, based on 100 parts by weight of PVC.

The terminal epoxide compounds (c) which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The terminal epoxide compounds contain at least one epoxy radical, in particular of the formula I

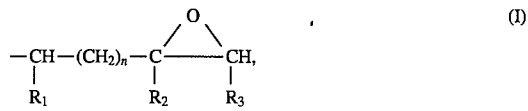

which is bonded directly to carbon, oxygen, nitrogen or sulfur atoms, where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1.

Examples which may be mentioned of terminal epoxide compounds are: I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other terminal epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$alkanol and $C_9$–$C_{11}$alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic rings, such as N,N-bis(2-hydroxyethyl)aniline or p,p'-bis(2-hydroxyethylamino)diphenylmethane.

The terminal epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dehydroxydiphenyl sulfone or on condensation products of phenols with formaldehyde obtained under acid conditions, such as phenol novolaks.

Examples of other possible terminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N',N"-tri- and N,N',N",N"'-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl)ether.

V) Terminal epoxide compounds containing a radical of the formula I in which $R_1$ and $R_3$ together are —$CH_2$—$CH_2$—, and n is 0, are bis(2,3-epoxycyclopentyl)ether, 2,3-epoxycyclopentyl glycidyl ether or 1,2-bis(2,3-epoxycyclopentoxy)ethane. An example of a terminal epoxy resin containing a radical of the formula I in which $R_1$ and $R_3$ together are —$CH_2$—$CH_2$— and n is 1 is 3'4'-epoxy-6'-methylcyclohexyl)methyl 3,4-epoxy-6-methylcyclohexanecarboxylate.

Examples of suitable terminal epoxides are:
a) liquid bisphenol A diglycidyl ethers, such as Araldit®GY 240, Araldit®GY 250, Araldit®GY 260, Araldit®GY 266, Araldit®GY 2600, Araldit®MY 790;
b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;
c) liquid bisphenol F diglycidyl ethers, such as Araldit®GY 281, Araldit®PY 302, Araldit®PY 306;
d) solid polyglycidyl ethers of tetraphenylethane, such as CG Epoxy Resin®0163;
e) solid and liquid polyglycidyl ethers of phenol-formaldehyde novolak, such as EPN 1138, EPN 1139, GY 1180, PY 307;
f) solid and liquid polyglycidyl ethers of o-cresol-formaldehyde novolak, such as ECN 1235, ECN 1273, ECN 1280, ECN 1299;
g) liquid glycidyl ethers of alcohols, such as Shell® glycidyl ether 162, Araldit®DY 0390, Araldit®DY 0391;
h) liquid glycidyl ethers of carboxylic acids, such as Shell®Cardura E terephthalates, trimellitates, Araldit®PY 284;
i) solid heterocyclic epoxy resins (triglycidyl isocyanurates), such as Araldit®PT 810;
j) liquid cycloaliphatic epoxy resins, such as Araldit®CY 179;
k) liquid N,N,O-triglycidyl ether of p-aminophenol, such as Araldit®MY 0510;
l) tetraglycidyl-4,4'-methylenebenzamine or N,N,N',N'-tetraglycidyldiaminophenylmethane, such as Araldit®MY 720, Araldit®MY 721.

Preference is given to terminal epoxide compounds containing two functional groups. However, it is in principle possible for terminal epoxide compounds containing one, two or more functional groups to be used.

Predominantly employed are terminal epoxide compounds, in particular diglycidyl compounds, having aromatic structures.

If desired, a mixture of terminal epoxide compounds of different structures can also be employed.

Particularly preferred terminal epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

The terminal epoxide compounds can be employed in an amount of preferably at least 0.1 part by weight, for example from 0.1 to 50 parts by weight, preferably from 1 to 30 parts by weight, in particular from 1 to 20 parts by weight, based on 100 parts by weight of PVC.

The PVC stabilized according to the invention may contain further additives. These are, for example, plasticizers, fillers and reinforcing materials (for example calcium carbonate, silicates, glass fibres, talc, kaolin, chalk, mica, metal oxides and hydroxides, carbon black or graphite), antioxidants, polyols, zeolites, hydrotalcites, organic phosphites, 1,3-diketo compounds, dihydropyridines, sterically hindered amines (HALS), light stabilizers, UV absorbers, lubricants, fatty acid esters, paraffins, blowing agents, optical brighteners, pigments, flameproofing agents, antistatics, β-aminocrotonates (for example as mentioned in EP 0 465 405, p. 6, lines 9–14), phosphates, thiophosphates, gelling aids, peroxide-destroying compounds, modifiers and further complexing agents for Lewis acids.

The chalk used is preferably a chalk which has been surface-treated with fatty acids, silanes or titanates. The surface treatment is preferably carried out using fatty acids or fatty acid mixtures or technical-grade fatty acids, particular preference being given to $C_{10}$–$C_{30}$ fatty acids and specifically stearic acid. In general, the fatty acid is applied in liquid form to the still-warm chalk in an amount of from 0.5 to 1%. During this operation, the fatty acids are partially converted to the corresponding calcium salts, but these are unable to leave the chalk cavities again. Surface-treated chalks are known in general terms and are commercially available; they are marketed, for example, by the Omya company as Omyalite 90T or Omya EXH1.

The preferably surface-treated chalks can be employed in an amount of preferably at least 10 parts by weight, for example from 15 to 80 parts by weight, preferably from 25 to 75 parts by weight and in particular from 40 to 75 parts by weight, based on 100 parts by weight of PVC.

Examples of suitable organic plasticizers are those from the following groups:

A) Phthalates (esters of phthalic acid) Examples of these plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$- and $C_9$–$C_{11}$alkyl phthalates made from predominantly linear alcohols, $C_6$–$C_{10}$-n-alkyl phthalates and $C_8$–$C_{10}$n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl, di-isononyl and di-isodecyl phthalate.

B) Esters of aliphatic dicarboxylic acids, in particular esters of adipic, azelaic and sebacic acids Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6$–$C_8$alkyl, tri-$C_6$–$C_{10}$alkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Epoxy plasticizers

E) Polymer plasticizers A definition of these plasticizers and examples thereof are given in "Plastics Additives", edited by H. Gächter and H. Müuller, Hanser Publishers, 1990, page 393–396 and in "PVC Technology", edited by W. V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticizers made from said dicarboxylic acids and monofunctional alcohols.

F) Esters of phosphoric acid A definition of these esters is given in the abovementioned book "Plastics Additives" page 390–393. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50.

G) Chlorinated hydrocarbons (paraffins)

H) Hydrocarbons

I) Monoesters, for example butyl oleate, phenoxyethyl oleate, tetrahydrofurfuryl oleate and esters of alkylsulfonic acids.

J) Glycol esters, for example diglycol benzoates.

Definitions and examples of plasticizers from groups G) to J) are given in the following handbooks:

"Plastics Additives", edited by H. Gächter and H. Müller, Hanser Publishers, 1990, page 403–405 (Group G)) and page 403 (Group H)).

"PVC Technology", edited by W. V. Titow, 4th Ed., Elsevier Publishers, 1984, pages 171–173, chapter 6.10.2 (Group G)), page 174, chapter 6.10.5 (group H)), page 173, chapter 6.10.3 (group I)) and pages 173–174, chapter 6.10.4 (group J)).

Particular preference is given to plasticizers from group A) to F), in particular A) to D) and F), especially the plasticizers in these groups which have been mentioned as preferred.

It is also possible to use mixtures of different plasticizers.

The plasticizers can be used in an amount of, for example, from 5 to 120 parts by weight, preferably from 10 to 100 parts by weight, in particular from 20 to 70 parts by weight, based on 100 parts by weight of PVC.

1,3-Dicarbonyl compounds which can be used can be linear or cyclic dicarbonyl compounds. Preference is given to dicarbonyl compounds of the formula VII

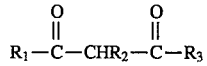

in which $R_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_5$—S—$R_6$ or —$R_5$—O—$R_6$ group, $R_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a —CO—$R_4$ group, $R_3$ has one of the meanings given for $R_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A-346 279 and the oxa- and thiadiketones of EP-A-307 358, and the isocyanuric acid-based diketones of U.S. Pat. No. 4,339,383.

Alkyl $R_1$ and $R_3$ can be, in particular, $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R_1$ and $R_3$ are, in particular, a —$(CH_2)_n$—OH group, in which n is 5, 6 or 7.

Alkenyl $R_1$ and $R_3$ can be, for example, vinyl, allyl, methallyl, 1-butenyl, 1-hexenyl or oleyl, preferably allyl.

OH—, alkyl-, alkoxy- or halogen-substituted phenyl $R_1$ and $R_3$ can be, for example, tolyl, xylyl, tert-butylphenyl, methoxyphenyl, ethoxyphenyl, hydroxyphenyl, chlorophenyl or dichlorophenyl.

Phenylalkyl $R_1$ and $R_3$ are, in particular, benzyl. Cycloalkyl or alkylcycloalkyl $R_2$ and $R_3$ are, in particular, cyclohexyl or methylcyclohexyl.

Alkyl $R_2$ can be, in particular, $C_1$–$C_4$alkyl. $C_2$–$C_{12}$alkenyl $R_2$ can be, in particular, allyl. Alkylphenyl $R_2$ can be, in particular, tolyl. Phenylalkyl $R_2$ can be, in particular, benzyl. $R_2$ is preferably hydrogen. Alkoxy $R_3$ can be, for example, methoxy, ethoxy, butoxy, hexyloxy, octyloxy, dodecyloxy, tridecyloxy, tetradecyloxy, or octadecyloxy. $C_1$–$C_{10}$alkylene $R_5$ is, in particular, $C_2$–$C_4$alkylene. Alkyl $R_6$ is, in particular, $C_4$–$C_{12}$ alkyl, for example butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the formula VII are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, 5-hydroxycaproylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl- 4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propoyl, butyl, hexyl or octyl stearoyl acetate and dehydracetic acid, and the zinc or magnesium salts thereof.

Preference is given to 1,3-diketo compounds of the formula VII in which $R_1$ is $C_1$–$C_{18}$alkyl, phenyl, phenyl which is substituted by OH, methyl or methoxy, $C_7$–$C_{10}$phenylalkyl or cyclohexyl, $R_2$ is hydrogen, and $R_3$ has one of the meanings given for $R_1$.

The 1,3-diketo compounds can be used in an amount of, for example, from 0.01 to 10 parts by weight, preferably from 0.01 to 2 parts by weight, in particular from 0.1 to 1 part by weight, based on 100 parts of weight of PVC.

Examples of suitable antioxidants are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2, 6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

5. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl- 4-hydroxybenzyl)-2,3,5, 6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl)phosphite, trilauryl phosphite, trioctadecyl phosphite, tridecyl phosphite, distearyl pentaerythrityl diphosphite, tris(2,4-di-tert-butylphenyl)phosphite, diisodecyl pentaerythrityl diphosphite, bis(2,4-di-tert-butylphenyl)pentaerythrityl diphosphite, bis(2,6-di-tert-butyl-4-methylphenyl)pentaerythrityl diphosphite, bisisodecyloxy pentaerythrityl diphosphite, bis(2,4-di-tert-butyl-6-methylphenyl)pentaerythrityl diphosphite, bis(2,4,6-tri-tert-butylphenyl)pentaerythrityl diphosphite, tristearyl sorbityl triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro- 2,4,8,10-tetra-tert-butyl-12-methyldibenz[d,g]-1,3,2-dioxaphosphocine, bis(2,4-di-tert-butyl-6-methylphenyl)methyl phosphite, bis(2,4-di-tert-butyl-6-methylphenyl)ethyl phosphite $(C_{19}H_{19}-C_6H_4)_{1.5}-P-(O-C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

13. Esters of β-(5-tert-butyl-4-hydroxy-3-methylphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

15. Esters of β-(3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tri(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preference is given to phenolic antioxidants, in particular from groups 1-5 and 12, and to antioxidants from group 10; particularly preferred are 2,2-bis(4-hydroxyphenyl)propane, esters of 3,5-di-tert-butyl-4-hydroxyphenylpropionic acid with octadecanol or pentaerythritol, and tris(2,4-di-tert-butylphenyl)phosphite.

If desired, a mixture of antioxidants of different structures can be employed.

The antioxidants are used in an amount of, for example, 0.01 to 10 parts by weight, preferably from 0.1 to 10 parts by weight, in particular from 0.1 to 5 parts by weight, based on 100 parts by weight of PVC.

Examples of suitable UV absorbers and light stabilizers are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-( 1,1,3,3-tetramethylbutyl)phenyl)benzotriazole, 2-(3',5'-di-tert-butyl- 2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl- 2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)- 6-benzotriazol-2-yl phenol]; transesterification product of 2-[3'-tert-butyl- 5'-(2-methoxycarbonylethyl)-2'-hydroxyphenyl]benzotriazole with polyethylene glycol 300; [R—CH$_2$CH$_2$—COO(CH$_2$)$_3$]$_{\overline{3}}$ where R=3'-tert-butyl-4'-hydroxy-5'-2H-benzotriazol-2-yl phenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl)sebacate, bis(2,2,6,6-tetramethylpiperidyl)succinate, bis(1,2,2,6,6-pentamethylpiperidyl)sebacate, bis(1,2,2,6,6-pentamethylpiperidyl)n-butyl-3,5-di-tert-butyl-4-hydroxybenzylmalonate, the product of the condensation of 1-hydroxyethyl-2,2,6,6-tetramethyl-4-hydroxypiperidine and succinic acid, the products of the condensation of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)1,2,3,4-butanetetraoate, 1,1'-(1,2-ethanediyl)bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy- 2,2,6,6-tetrmethylpiperidyl)sebacate, bis(1-octyloxy-2,2,6,6-tetramethylpiperidyl)succinate, the product of the condensation of N,N'-bis(2,2,6,6-tetramethyl- 4-piperidyl)hexamethylene diamine and 4-morpholino-2,6-dichloro-1,3,5-triazine, the product of the condensation of 2-chloro-4,6-di(4-n-butylamino-2,2,6,6-tetramethylpiperidyl) 1,3,5-triazine and 1,2-bis(3-aminopropylamino)ethane, the product of the condensation of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl- 1,3,8-triazaspiro[4.5]decane-2,4-dione, 3-dodecyl-1-(2,2,6,6-tetramethyl-4-piperidyl)pyrrolidine- 2,5-dione, 3-dodecyl-1-(1,2,2,6,6-pentamethyl- 4-piperidyl)pyrrolidine-2,5-dione.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)- 1,3,5-triazine, 2-[2-hydroxy-4-(2-hydroxy-3-octyloxypropoxy)phenyl]-4,6-bis(2,4-dimethylphenyl)-1,3,5-triazine.

Examples of suitable peroxide-destroying compounds are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable lubricants are: montan wax, fatty acid esters, PE waxes, amide waxes, chlorinated paraffins, glycerol esters and alkaline earth metal soaps. Lubricants which can be used are also described in "Plastics Additives", edited by H. Gächter and H. Müller, Hanser Verlag, 3rd Edition, 1990, pages 466–470. If calcium soaps are used, they should be employed in the amounts conventional for lubricants, preferably less than 0.3 part, particularly preferably less than 0.2 part, per 100 parts of PVC. Preference is given to stabilized PVC containing no calcium soaps.

Examples of suitable polyols are: pentaerythritol, dipentaerythritol, tripentaerythritol, bistrimethylolpropane, bistrimethylolethane, trismethylolpropane, sorbitol, maltitol, isomaltitol, lactitol, isomaltol, lycasin, mannitol, lactose, leucrose, tris(hydroxyethyl)isocyanurate, palatinitol, tetramethylolcyclohexanol, tetramethylolcyclopentanol, tetramethylolcyclopyranol, glycerol, diglycerol, polyglycerol and 1-O-α-D-glycopyranosyl-D-mannitol dihydrate.

The polyols can be used in an amount of, for example, from 0.01 to 20 parts by weight, preferably from 0.1 to 20 parts by weight, in particular from 0.1 to 10 parts by weight, based on 100 parts by weight of PVC.

Suitable phosphites are organic phosphites of the general formula $P(OR)_3$, where the radicals R are identical or different alkyl, alkenyl, aryl or aralkyl radicals. Preferred organic phosphites are those of the formulae

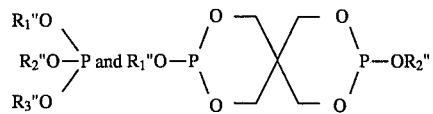

in which $R_1"$, $R_2"$ and $R_3"$ are identical or different and are $C_6$–$C_{18}$alkyl, $C_6$–$C_{18}$alkenyl, substituted or unsubstituted phenyl or $C_5$–$C_7$cycloalkyl.

$C_6$–$C_{18}$alkyl $R_1"$, $R_2"$ and $R_3"$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R_1"$, $R_2"$ and $R_3"$ are, for example, tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, 2,4-di-tert-butylphenyl didodecyl and 2,6-di-tert-butylphenyl didodecyl phosphites and dialkyl and diaryl pentaerythrityl diphosphites, such as distearyl pentaerythrityl diphosphite.

Preferred organic phosphites are distearyl pentaerythrityl diphosphite, trisnonylphenyl phosphite, tridecyl phosphite, diphenyl decyl phosphite and phenyl didecyl phosphite.

The organic phosphites can be used in an amount of, for example, from 0.01 to 5 parts by weight, preferably from 0.05 to 3 parts by weight, in particular from 0.1 to 1 part by weight, based on 100 parts by weight of PVC.

Suitable compounds from the series consisting of the hydrotalcites or zeolites are both naturally occurring minerals and synthetic compounds.

Compounds from the series consisting of the hydrotalcites can be described by the general formula I $$M^{2+}_{1-x} \cdot M^{3+}_x \cdot (OH)_2 \cdot (A^{n-})_{x/n} \cdot mH_2O \qquad (I)$$

where $M^{2+}$=Mg, Ca, Sr, Zn, Sn and/or Ni, $M^{3+}$=Al, B or Bi, $A^{n-}$ is an anion having the valency n, n is a number from 1 to 4, x is a number from 0 to 0.5 and m is a number from 0 to 2.

$A^{n-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $$\begin{matrix} COO^- \\ | \\ COO^- \end{matrix}, (CHOHCOO)_2^{2-},$$

$(CHOH)_4CH_2OHCOO^- \cdot C_2H_4(COO)_2^{2-}$,
$(CH_2COO)_2^{2-}$, $CH_3CHOHCOO^-$, $SiO_3^{2-}$, $SiO_4^{4-}$,
$Fe(CN)_6^{3-}$, $Fe(CN)_6^{4-}$ or $HPO_4^{2-}$;

further examples are given in DE 41 06 403.

Other hydrotalcites which can preferably be used are compounds having the general formula Ia $$M_x^{2+}Al_2(OH)_{2x+6nz}(A^{n-})_2 \cdot mH_2O \qquad (Ia)$$

where $M^{2+}$ is at least one metal from the series consisting of Mg and Zn, preferably Mg, $A^{n-}$ is an anion, preferably from the series consisting of $CO_3^{2-}$, $$\begin{pmatrix} COO \\ | \\ COO \end{pmatrix}^{2-},$$

$OH^-$ and $S^{2-}$, where n is the valency of the anion, n is a positive number, preferably from 0.5 to 5, and x and z are positive numbers, x preferably being from 2 to 6 and z preferably being less than 2.

Preference is given to compounds from the series consisting of the hydrotalcites of the general formula I $$M^{2+}_{1-x} \cdot M^{3+}_x \cdot (OH)_2 \cdot (A^{n-})_{x/n} \cdot mH_2O \qquad (I)$$

where $M^{2+}$ is Mg or a solid solution of Mg and Zn, $A^{n-}$ is $CO_3^{2-}$, x is a number from 0 to 0.5, and m is the number from 0 to 2.

Very particular preference is given to hydrotalcites of the formulae $Al_2O_3 \cdot 6MgO \cdot CO_2 \cdot 12H_2O$, $Mg_{4.5}Al_2(OH)_{13} \cdot CO_3 \cdot 3.5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

The hydrotalcites can be used in an amount of, for example, from 0.1 to 20 parts by weight, preferably from 0.5 to 10 parts by weight, in particular from 0.5 to 5 parts by weight, based on 100 parts by weight of PVC.

Zeolites can be described by the general formula (X)

$$M_{x/n}[(AlO_2)_x(SiO_2)_y] \cdot wH_2O \qquad (X)$$

where n is the charge of the cation M,

M is an element from the first or second main group, or zinc, y:x is a number between 0.8 and infinity, preferably between 0.8 and 10.5, and w is a number between 0 and 300.

Furthermore, zeolites which can be used according to the invention are disclosed in "Atlas of Zeolite Structure Types", W. M. Meier and D. H. Olson, Butterworths, 2nd Edition, 1986.

Zeolites in a broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites for A.

Particular preference is given to crystalline sodium aluminosilicates whose particle size is at least predominantly in the range from 1–10 μm.

In a preferred embodiment of the invention, sodium aluminosilicates having rounded corners and edges can also be used. These zeolites are advantageously prepared from a batch whose molar composition is in the range 2.5–6.0 $Na_2O \cdot Al_2O_3 : 0.5$–5.0 $SiO_2 \cdot 60$–200 $H_2O$. This batch is crystallized in a conventional manner, advantageously by warming at 70°–120° C., preferably 80°–95° C., with stirring for at least ½ hour. The crystalline product is separated off in a simple manner, washed and then dried.

For the purposes of the present invention, finely divided, water-insoluble sodium aluminosilicates which have been precipitated and crystallized in the presence of water-soluble inorganic or organic dispersants can also be used. Suitable water-soluble organic dispersants are surfactants, non-surfactant aromatic sulfonic acids and compounds which are able to complex calcium. Said dispersants can be introduced into the reaction mixture in any desired manner before or during the precipitation; for example, they can be initially introduced as a solution or dissolved in the aluminate and/or silicate solution. The amount of dispersant should be at least 0.05 percent by weight, preferably from 0.1–5 percent by weight, based on the total precipitation batch. For the crystallization, the precipitation product is heated at from 50° to 200° C. for from ½ to 24 hours. From the multiplicity of dispersants which can be used, examples which may be mentioned are sodium lauryl ether sulfate, sodium polyacrylate and the sodium salt of 1-hydroxyethane-1,1-diphosphonic acid.

Preference is given to stabilized PVC, as described above, containing at least one of the compounds of the formulae $Na_{12}Al_{12}Si_{12}O_{48} \cdot 27 H_2O$ [zeolite A], $Na_6Al_6Si_6O_{24} \cdot 2 NaX \cdot 7.5 H_2O$, X=OH, halogen, $ClO_4$ [sodalite]

$Na_6Al_6Si_{30}O_{72} \cdot 24 H_2O$, $Na_8Al_8Si_{40}O_{96} \cdot 24 H_2O$, $Na_{16}Al_{16}Si_{24}O_{80} \cdot 16 H_2O$, $Na_{16}Al_{16}Si_{32}O_{96} \cdot 16 H_2O$, $Na_{56}Al_{56}Si_{136}O_{384}.250\ H_2O$, [zeolite Y]

$Na_{86}Al_{86}Si_{106}O_{384}.264\ H_2O$ [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64}.20\ H_2O$.

$Ca_{4.5}Na_3[(AlO_2)_{12}(SiO_2)_{12}].30\ H_2O$ $K_9Na_3[(AlO_2)_{12}(SiO_2)_{12}].27\ H_2O$.

The zeolites can be used in an amount of, for example, from 0.1 to 20 parts by weight, preferably from 0.5 to 10 parts by weight, in particular from 0.5 to 5 parts by weight, based on 100 parts by weight of PVC.

Preference is given to stabilized PVC comprising (a) PVC, (b) an organic zinc compound, in particular 0.001–5.0 parts, per 100 parts of PVC, and (c) a terminal epoxide compound, in particular 0.1–5.0 parts, per 100 parts of PVC, and, if desired, chalk, in particular at least 10 parts per 100 parts of PVC, and/or a phenolic antioxidant, in particular 0.01–10.0 parts per 100 parts of PVC.

Preference is furthermore given to stabilized PVC additionally containing a plasticizer, in particular 5–120 parts per 100 parts of PVC.

Preference is furthermore given to stabilized PVC additionally containing a 1,3-diketo compound, in particular 0.01–10 parts per 100 parts of PVC.

Preference is furthermore given to stabilized PVC additionally containing a polyol, in particular 0.01–20 parts per 100 parts of PVC.

Preference is furthermore given to stabilized PVC additionally containing a zeolite, in particular 0.1–20 parts per 100 parts of PVC.

Preference is furthermore given to stabilized PVC additionally containing a hydrotalcite, in particular 0.1–20 parts per 100 parts of PVC.

Preference is furthermore given to stabilized PVC additionally containing an organic phosphite, in particular 0.01–5 parts per 100 parts of PVC.

Preference is furthermore given to stabilized PVC additionally containing a dihydropyridine, in particular 0.01–5 parts per 100 parts of PVC.

Preference is furthermore given to stabilized PVC additionally containing a sterically hindered amine, in particular 0.01–5 parts per 100 parts of PVC.

Particular preference is given to stabilized PVC comprising, in addition to PVC, organic zinc compound, terminal epoxide compound, chalk and phenolic antioxidant, both a 1,3-diketo compound and a polyol.

Particular preference is given to stabilized PVC comprising, in addition to PVC, organic zinc compound, terminal epoxide compound, chalk and phenolic antioxidant, both a 1,3-diketo compound and a hydrotalcite.

Particular preference is given to stabilized PVC comprising, in addition to PVC, organic zinc compound, terminal epoxide compound, chalk and phenolic antioxidant, both a 1,3-diketo compound and a zeolite.

The present invention furthermore relates to a stabilizer mixture comprising an inorganic or organic zinc compound and a terminal epoxide compound. The above preferences apply to the individual mixture constituents, and the stabilizer mixture can likewise contain the other constituents described above.

The present invention furthermore relates to the use of an inorganic or organic zinc compound in combination with a terminal epoxide compound for stabilizing PVC. The above preferences apply to the individual stabilizers and to the PVC itself, and one of the further constituents described above can likewise additionally be used.

The PVC stabilized according to the invention can be prepared in a manner known per se, to which end said stabilizers and, if desired, further additives are mixed with the PVC using equipment known per se, such as calendars, mixers, compounders, extruders and the like. During this operation, the stabilizers can be added individually or as a mixture or alternatively in the form of masterbatches.

The PVC stabilized in accordance with the present invention can be converted into the desired shape in a known manner. Methods of this type are, for example, grinding, calendaring, extrusion, injection moulding, sintering or spinning, furthermore extrusion blow moulding or conversion by the plastisol process. The stabilized PVC can also be converted into foams.

The PVC according to the invention is particularly suitable for semirigid and flexible formulations, in particular in the form of flexible formulations for wire sheaths and cable insulations, which is particularly preferred. In the form of semi rigid formulations, the PVC according to the invention is particularly suitable for decorative films, foams, agricultural sheeting, tubes, sealing profiles and office films.

In the form of rigid formulations, the PVC stabilized according to the invention is particularly suitable for hollow articles (bottles), packaging films (thermoformed films), blown films, crash-pad films (automobiles), tubes, foams, heavy profiles (window frames), light-wall profiles, building profiles, sidings, fittings, office films and equipment housings (computers and domestic applicances).

Examples of the use of the PVC according to the invention as plastisols are artificial leather, floor coverings, textile coatings, wall coverings, coil coatings and automobile underseal.

Examples of sintered PVC applications of the PVC stabilizer according to the invention are slush, slush mould and coil coatings.

The examples below illustrate the invention in greater detail without representing a limitation. Parts and percentages are, as in the remainder of the description, by weight, unless stated otherwise.

EXAMPLES

A PVC composition is prepared by mixing the individual components as shown in the tables below (amounts in parts by weight).

The constituents are homogenized for 5 minutes in mixing rolls at 190° C. giving a film with a thickness of 0.3–0.5 mm.

The long-term stability is determined by a static heat test ("stat.h.") in accordance with DIN 53381, in which the sample is stored in a test oven at 190° C. and the time taken for the sample to blacken is determined.

A further determination of the long-term stability ("VDE test") is carried out by determining the thermal stability in accordance with DIN VDE 0472. In this test, the sample is warmed in a glass tube sealed at the bottom (AR glass from Peco-Laborbedarf GmbH, Darmstadt) in an oil bath at 200° C., and the time taken for a visible red coloration (corresponding to a pH of 3) to appear on the universal indicator paper is determined.

A further determination of the stability of the PVC is carried out by the dehydrochlorination test ("DHC test"), carried out in accordance with DIN 53381, sheet 3. In this test, the time taken for the dehydrochlorination curve to rise is measured at the temperature shown in each case.

The abbreviations used in the tables below have the following meanings:

AO-1: bisphenol A
AO-2: octadecyl 3-(3,5-di-tert-butyl-4-hydroxyphenyl)propionate
AO-3: pentaerythrityl tetrakis-3-(3,5-di-tert-butyl-4-hydroxyphenyl)propionate
AO-4: $(C_9H_{19}\text{-}C_6H_4\text{-}O)_{1.5}\text{-}P\text{-}(O\text{-}C_{12/13}H_{25/27})_{1.5}$
AO-5: dihydropyridine

AO-6:

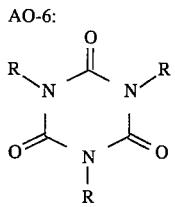

mit $R = (CH_2)_2-O-C(O)-CH_2-C(O)-CH_3$ chalk: surface treated with about 0.75% stearic acid (Omya EXH1 or Omyalite T90 from Omya)
D-1: stearoylbenzoylmethane
D-2: trishydroxyethyl isocyanate
D-3: isooctylbenzoylmethane
D-4: dibenzoylmethane
E-1: bisphenol A diglycidylether (Araldit® GY 250)
E-2: bisphenol F diglycidylether (Araldit® GY 281)
E-3: polyglycidyl ether of phenolformaldehyde novolak (Araldit® GY 1180)
E-4: polyglycidyl ether of tetraphenylethane (CG Epoxy Resin® 0163)
E-5: cycloaliphatic epoxy resin (Araldit® CY 179)
E-6: bisphenol F diglycidyl ether (Araldit® PY 306)
E-7: triglycidyl trimellitate
E-8: diglycidyl terephthalate
E-9: mixture of E-7 and E-8
H-1: (hydrotalcite from Kyowa) Alkamizer®IV
P-1: reduced reallose (Malbit®CR Cerestar)
P-2: reduced lactose (lactitol)
P-3: α-D(+)lactose
P-4: β-D(+)lactose
P-5: palatinose
P-6: D(+)maltose
P-7: isomaltitol
P-8: leucrose
P-9: pentaerythritol
P-10: dipentaerythritol
P-11: sorbitol
P-12: tetramethylolcyclohexanol
P-13: ditrimethylolpropane
PVC-1: PVC K value 70
W-1: plasticizer diisodecyl phthalate
Z-1: Wessalith P®, 4A zeolite from Degussa
Zn-1: zinc stearate
Zn-2: zinc hydroxide
Zn-3: zinc sulfide
Zn-4: basic zinc octanoate
Zn-5: zinc laurate
Zn-6: zinc acetate
Zn-7: zinc benzoate
Zn-8: zinc oxide
compound used for comparative purposes:
E-V1: epoxidized soybean oil

TABLE 1

| Example | 1 | 2 | 3 | 4 | 5 | 6 |
|---|---|---|---|---|---|---|
| PVC-1 | 100 | 100 | 100 | 100 | 100 | 100 |
| W-1 | 49 | 49 | 49 | 49 | 49 | 49 |
| Chalk | 50 | 50 | 50 | 50 | 50 | 50 |
| Zn-1 | — | 0.38 | — | 0.38 | — | 0.38 |
| E-V1 | — | — | 5 | 5 | — | — |
| E-1 | — | — | — | — | 5 | 5 |
| "VDE test" | 6.5 | 5 | 13 | 10 | 31 | 50 [min] |

Examples 1–4 (not according to the invention) show the impairment in long-term stability expected due to the addition of a zinc stearate (Zn-1), both for the base mixture (Examples 1 and 2) and for a mixture containing epoxidized soybean oil (E-VI) (Examples 3 and 4). By contrast, the final column of Table 1 shows the improvement in long-term stability achieved by means of the invention through the combination of a zinc compound (Zn-1) and a terminal epoxide (E-1).

TABLE 2

| Example | 7 | 8 | 9 | 10 | 11 | 12 |
|---|---|---|---|---|---|---|
| PVC-1 | 100 | 100 | 100 | 100 | 100 | 100 |
| W-1 | 49 | 49 | 49 | 49 | 49 | 49 |
| Chalk | 50 | 50 | 50 | 50 | 50 | 50 |
| Zn-1 | — | 0.3 | 0.3 | — | 0.3 | 0.3 |
| AO-2 | — | — | 0.5 | — | — | 0.5 |
| E-1 | — | — | — | 5 | 5 | 5 |
| E-V1 | 5 | 5 | 5 | — | — | — |
| "VDE-Test" | 9 | 10.5 | 30 | 27.5 | 42 | 81.5 [min] |

Examples 11 and 12 show the long-term stability when a formulation according to the invention is used; this is significantly lower for Examples 7–10, which are not according to the invention. Only the use of an additional oxidant (AO-2) in Example 9, which is not according to the invention, causes a significant increase in the long-term stability, whereas the combination according to the invention of a zinc compound (Zn-1) and a terminal epoxide (E-1) in Example 11 already gives a better value, and this can be further significantly increased by an antioxidant (AO-2).

TABLE 3

| Example | 13 | 14 | 15 | 16 | 17 | 18 |
|---|---|---|---|---|---|---|
| PVC-1 | 100 | 100 | 100 | 100 | 100 | 100 |
| W-1 | 49 | 49 | 49 | 49 | 49 | 49 |
| Chalk | 50 | 50 | 50 | 50 | 50 | 50 |
| Zn-1 | 0.3 | 0.3 | 0.3 | 0.6 | 0.6 | 0.6 |
| E-1 | 5 | 5 | 5 | 5 | 4 | 3 |
| AO-1 | — | — | 0.5 | 0.5 | 0.5 | 0.5 |
| AO-2 | 0.5 | 0.5 | — | — | — | — |
| Z-1 | — | 1 | — | — | — | — |
| D-1 | — | — | 0.3 | — | — | — |
| P-1 | — | — | — | 0.5 | 0.5 | 0.5 |
| "VDE test" | 81.5 | 88 | 88 | 132 | 111 | 108 [min] |

Examples 13–16 show the additional use possible according to the invention of antioxidants (AO-1 and AO-2), zeolite (Z-1), 1,3-diketo compound (D-1) and polyol (P-1).

TABLE 4

| Example | 19 | 20 | 21 | 22 |
|---|---|---|---|---|
| PVC-1 | 100 | 100 | 100 | 100 |
| W-1 | 49 | 49 | 49 | 49 |
| Chalk | 50 | 50 | 50 | 50 |

TABLE 4-continued

| Example | 19 | 20 | 21 | 22 |
|---|---|---|---|---|
| Zn-1 | 0.3 | 0.3 | 0.3 | 0.3 |
| E-2 | 5 | — | — | — |
| E-3 | — | 5 | — | — |
| E-4 | — | — | 5 | — |
| E-5 | — | — | — | 5 |
| AO-1 | 0.5 | 0.5 | 0.5 | 0.5 |
| "VDE test" | 98 | 97 | 103 | 110 [min] |

TABLE 5

| Example | 23 | 24 | 25 | 26 |
|---|---|---|---|---|
| PVC-1 | 100 | 100 | 100 | 100 |
| W-1 | 49 | 49 | 49 | 49 |
| Chalk | 50 | 50 | 50 | 50 |
| Zn-1 | 0.3 | 0.3 | 0.3 | 0.3 |
| E-6 | 5 | — | — | — |
| E-7 | — | 5 | — | — |
| E-8 | — | — | 5 | — |
| E-9 | — | — | — | 5 |
| AO-1 | 0.5 | 0.5 | 0.5 | 0.5 |
| "VDE test" | 97 | 109 | 92.5 | 98.5 [min] |

Examples 19–26 according to the invention show the values for long-term stability for various classes of terminal epoxides (E-2 to E-9).

TABLE 6

| Example | 27 | 28 | 29 | 30 |
|---|---|---|---|---|
| PVC-1 | 100 | 100 | 100 | 100 |
| W-1 | 49 | 49 | 65 | 43 |
| Chalk | 50 | 50 | 40 | 11 |
| Zn-1 | 0.3 | 0.3 | 0.3 | 0.3 |
| AO-2 | 0.5 | 0.5 | 0.5 | 0.5 |
| E-1 | 5 | 5 | 5 | 5 |
| D-1 | 0.3 | 0.3 | 0.3 | 0.3 |
| P-1 | — | 0.5 | 0.5 | 0.5 |
| "VDE test" | 88 | 120.5 | | [min] |
| "stat.h." | 110 | 130 | 90 | 95 [min] |

Table 6 shows the use of a polyol (P-1) as a further possible stabilizer.

TABLE 7

| Example | 31 | 32 | 33 |
|---|---|---|---|
| PVC-1 | 100 | 100 | 100 |
| W-1 | 49 | 49 | 49 |
| Chalk | 50 | 50 | 50 |
| Zn-1 | 0.9 | 0.3 | 0.9 |
| AO-3 | 0.3 | 0.1 | 0.3 |
| H-1 | 4.5 | 1.5 | 4.5 |
| D-1 | 0.3 | 0.1 | 0.3 |
| E-V1 | 5 | — | — |
| E-1 | — | 5 | 5 |
| "VDE test" | 90.5 | 110 | 171.5 [min] |

Examples 32 and 33 according to the invention show the use of hydrotalcite (H-1) as an additional additive, a higher long-term stability than in Example 31, which is not according to the invention, being achieved using a third of the amount of additives (Z-1, AO-3, H-1 and D-1).

TABLE 8

| Example | 34 | 35 | 36 | 37 | 38 |
|---|---|---|---|---|---|
| PVC-1 | 100 | 100 | 100 | 100 | 100 |
| W-1 | 49 | 49 | 49 | 49 | 49 |
| Chalk | 50 | 50 | 50 | 50 | 50 |
| Zn-1 | 0.6 | — | — | — | — |
| Zn-2 | — | 0.6 | 0.1 | — | — |
| Zn-3 | — | — | — | 0.6 | 0.1 |
| AO-1 | 0.5 | 0.5 | 0.5 | 0.5 | 0.5 |
| E-1 | 5 | 5 | 5 | 5 | 5 |
| D-1 | 0.3 | 0.3 | 0.3 | 0.3 | 0.3 |
| P-1 | — | 0.5 | 0.5 | 0.5 | 0.5 |
| "VDE test" | 123 | 121 | 109 | 114 | 99 [min] |
| "stat.h." | >130 | >130 | 110 | 110 | 100 [min] |

Examples 35 to 38 show the use of inorganic zinc compounds (Zn-2 and Zn-3) as possible zinc compound according to the invention.

TABLE 9

| Example | 39 | 40 | 41 | 42 | 43 | 44 | 45 | 46 |
|---|---|---|---|---|---|---|---|---|
| PVC-1 | 100 | 100 | 100 | 100 | 100 | 100 | 100 | 100 |
| W-1 | 49 | 49 | 49 | 49 | 49 | 49 | 49 | 49 |
| Chalk | 50 | 50 | 50 | 50 | 50 | 50 | 50 | 50 |
| E-1 | 5 | 5 | 5 | 5 | 5 | 5 | 5 | 5 |
| AO-1 | 0.5 | 0.5 | 0.5 | 0.5 | 0.5 | 0.5 | 0.5 | 0.3 |
| D-1 | 0.3 | 0.3 | 0.3 | 0.3 | 0.3 | 0.3 | 0.3 | 0.3 |
| Zn-1 | 0.6 | 0.6 | 0.6 | 0.6 | 0.6 | 0.6 | 0.6 | 0.6 |
| P-1 | 0.5 | | | | | | | |
| P-2 | | 0.5 | | | | | | |
| P-3 | | | 0.5 | | | | | |
| P-4 | | | | 0.5 | | | | |
| P-5 | | | | | 0.5 | | | |
| P-6 | | | | | | 0.5 | | |
| P-7 | | | | | | | 0.5 | |
| P-8 | | | | | | | | 0.5 |
| "VDE test" | 120 | 80 | 82 | 79.5 | 106 | 93.5 | 103.5 | 106.5 [min] |
| "stat.h." | >130 | 115 | 115 | 105 | 125 | 120 | >130 | >130 [min] |

TABLE 10

| Example | 47 | 48 | 49 | 50 | 51 | 52 | 53 |
|---|---|---|---|---|---|---|---|
| PVC-1 | 100 | 100 | 100 | 100 | 100 | 100 | 100 |
| W-1 | 49 | 49 | 49 | 49 | 49 | 49 | 49 |
| Chalk | 50 | 50 | 50 | 50 | 50 | 50 | 50 |
| E-1 | 5 | 5 | 5 | 5 | 5 | 5 | 5 |
| Zn-1 | 0.6 | 0.6 | 0.6 | 0.6 | 0.6 | 0.6 | 0.6 |
| AO-1 | | | | | | | |
| P-1 | 0.5 | | | | | | |
| D-2 | | 0.5 | | | | | |
| P-9 | | | 0.5 | | | | |
| P-10 | | | | 0.5 | | | |
| P-11 | | | | | 0.5 | | |
| P-12 | | | | | | 0.5 | |
| P-13 | | | | | | | 0.5 |
| "VDE test" | 55 | 51 | 34.5 | 54.5 | 54 | 53 | 48 [min] |
| "DHC test"(*2) | 48 | 50 | 29 | 49 | 45.5 | 42.5 | 50 [min] |

(*2) at 200° C., induction period shown [0 μS]

TABLE 11

| Example | 54 | 55 | 56 |
|---|---|---|---|
| PVC-1 | 100 | 100 | 100 |
| W-1 | 49 | 49 | 49 |
| Chalk | 50 | 50 | 50 |
| E-1 | 5 | 5 | 5 |
| Zn-1 | 0.6 | 0.6 | 0.6 |
| AO-1 | 0.5 | 0.5 | 0.5 |
| P-1 | 0.5 | | |
| D-2 | | | |
| P-9 | | 0.5 | |
| P-10 | | | |
| P-11 | | | 0.5 |
| P-12 | | | |
| P-13 | | | |
| "VDE test" | 118.5 | 82.5 | 91.5 [min] |
| "DHC test"(*2) | 86 | 65 | 69.5 [min] |

(*2) at 200° C., induction period shown [0 μS]

TABLE 12

| Example | 57 | 58 | 59 | 60 | 61 | 62 |
|---|---|---|---|---|---|---|
| PVC-1 | 100 | 100 | 100 | 100 | 100 | 100 |
| W-1 | 49 | 49 | 49 | 49 | 49 | 49 |
| Chalk | 50 | 50 | 50 | 50 | 50 | 50 |
| E-1 | 5 | 5 | 5 | 5 | 5 | 5 |
| AO-1 | 0.5 | 0.5 | 0.5 | 0.5 | 0.5 | 0.5 |
| D-1 | 0.3 | 0.3 | 0.3 | 0.3 | 0.3 | 0.3 |
| P-1 | 0.5 | 0.5 | 0.5 | 0.5 | 0.5 | 0.5 |
| Zn-1 | 0.6 | | | | | |
| Zn-4 | | 0.6 | | | | |
| Zn-5 | | | 0.6 | | | |
| Zn-6 | | | | 0.6 | | |
| Zn-7 | | | | | 0.4 | |
| Zn-8 | | | | | | 0.1 |
| "VDE test" | 120.5 | 121.5 | 114.5 | 105 | 112 | 101.5 [min] |
| "DHC test" | 148.5 | 126.5 | 141.5 | 117 | 133 | 116.5 [min] |

TABLE 13

| Example | 63 | 64 | 65 |
|---|---|---|---|
| PVC-1 | 100 | 100 | 100 |
| W-1 | 54 | 54 | 54 |
| Chalk | 50 | 50 | 50 |
| E-1 | 1 | 3 | 5 |
| H-1 | 3 | 3 | 3 |
| Zn-1 | 0.6 | 0.6 | 0.6 |
| AO-1 | 0.5 | 0.5 | 0.5 |
| "VDE test" | 135 | 147.5 | 167.5 [min] |
| "stat.h" | >140 | >140 | >140 [min] |

TABLE 14

| Example | 66 | 67 | 68 | 69 | 70 | 71 | 72 | 73 | 74 |
|---|---|---|---|---|---|---|---|---|---|
| PVC-1 | 100 | 100 | 100 | 100 | 100 | 100 | 100 | 100 | 100 |
| W-1 | 49 | 49 | 49 | 49 | 49 | 49 | 49 | 49 | 49 |
| Chalk | 50 | 50 | 50 | 50 | 50 | 50 | 50 | 50 | 50 |
| E-1 | 5 | 5 | 5 | 5 | 5 | 5 | 5 | 5 | 5 |
| Zn-1 | 0.6 | 0.6 | 0.6 | 0.6 | 0.6 | 0.6 | 0.6 | 0.6 | 0.6 |
| AO-1 | 0.5 | 0.5 | 0.5 | 0.5 | 0.5 | 0.5 | 0.5 | 0.5 | 0.5 |
| P-1 | 0.5 | 0.5 | 0.5 | 0.5 | 0.5 | 0.5 | 0.5 | 0.5 | 0.5 |
| D-1 | 0.3 | | | | | | | 0.15 | 0.15 |
| D-3 | | 0.3 | | | | | | | |
| D-4 | | | 0.3 | | | | | | |
| AO-4 | | | | 0.8 | | 0.4 | 0.4 | 0.4 | |
| AO-5 | | | | | 0.3 | 0.15 | | 0.15 | |
| AO-6 | | | | | | | | | 0.3 |
| "stat.h." | >135 | 130 | 135 | 120 | 125 | 130 | >135 | >135 | >120 [min] |

TABLE 15

| Example | 75 | 76 | 77 | 78 | 79 | 80 |
|---|---|---|---|---|---|---|
| PVC-1 | 100 | 100 | 100 | 100 | 100 | 100 |
| W-1 | 49 | 49 | 49 | 49 | 49 | 49 |
| Chalk | 25 | 25 | 25 | 25 | 50 | 50 |

TABLE 15-continued

| Example | 75 | 76 | 77 | 78 | 79 | 80 | |
|---|---|---|---|---|---|---|---|
| Zn-1 | 0.3 | 0.3 | 0.3 | 0.3 | 0.3 | 0.3 | |
| AO-1 | 0.5 | 0.5 | 0.5 | 0.5 | 0.5 | 0.5 | |
| E-1 | — | — | 5 | 5 | 5 | 5 | |
| E-V1 | 5 | 5 | — | — | — | — | |
| Calcium stearate | — | 0.6 | — | 0.6 | — | 0.6 | |
| "VDE test" | 24 | 44 | 82 | 72 | 83 | 68 | [min] |

Examples 75 and 76, which are not according to the invention, show a low level of stabilization when a nonterminal epoxide (E-V1) is used; this can be improved by calcium stearate, but without reaching the values which can be achieved according to the invention.

What is claimed is:

1. A stabilized PVC composition comprising (a) PVC, (b) 0.001–5.0 parts, per 100 parts of PVC, of an inorganic or organic zinc compound, (c) at least 0.01 parts, per 100 parts of PVC, of a compound containing at least one terminal epoxide group and (d) at least 10 parts, per 100 parts of PVC, of chalk.

2. A stabilized PVC composition according to claim 1, wherein (b) is an organic zinc compound which is a zinc carboxylate of a carboxylic acid having 7 to 18 carbon atoms.

3. A stabilized PVC composition according to claim 1, wherein (c) is a terminal epoxide compound having an aromatic structure.

4. A stabilized PVC composition according to claim 1, wherein additional substances are present selected from the group consisting of plasticizers, fillers and reinforcing materials, antioxidants, polyols, zeolites, hydrotalcites, organic phosphites, 1,3-diketo compounds, dihydropyridines, sterically hindered amines (HALS), light stabilizers, UV absorbers, lubricants, fatty acid esters, paraffins, blowing agents, optical brighteners, pigments, flameproofing agents, antistatics, β-aminocrotonates, phosphates, thiophosphates, gelling aids, peroxide-destroying compounds, modifiers and further complexing agents for Lewis acids.

5. A stabilized PVC composition according to claim 1 comprising (a) PVC, (b) 0.001–5.0 parts, per 100 parts of PVC, of an organic zinc compound, (c) 0.1–50.0 parts, per 100 parts of PVC, of a compound containing at least one terminal epoxide group and (d) at least 10 parts, per 100 parts of PVC, of chalk.

6. A stabilized PVC composition according to claim 1, wherein a phenolic antioxidant is additionally present.

7. A stabilized PVC composition according to claim 1, wherein a plasticizer is additionally present.

8. A stabilized PVC composition according to claim 1, wherein a 1,3-diketo compound is additionally present.

9. A stabilizer composition suitable for stabilizing PVC comprising 0.001–5.0 parts of an inorganic or organic zinc compound, 0.01–5.0 parts of a compound containing at least one terminal epoxide group and 15–80 parts of chalk.

10. A stabilizer composition according to claim 9, further comprising a phenolic antioxidant.

11. A stabilizer composition according to claim 10, further comprising a 1,3-diketo compound and a polyol.

12. A stabilizer composition according to claim 10, further comprising a 1,3-diketo compound and a hydrotalcite.

13. A stabilizer composition according to claim 10, further comprising a 1,3-diketo compound and a zeolite.

14. A process for the preparation of a stabilized PVC composition, which process comprises mixing an effective stabilizing amount of a stabilizer composition according to claim 9 with PVC.

15. A process for the preparation of a stabilized PVC composition according to claim 14, further comprising adding further substances selected from the group consisting of plasticizers, fillers and reinforcing materials, antioxidants, polyols, zeolites, hydrotalcites, organic phosphites, 1,3-diketocompounds, dihydropyridines, sterically hindered amines (HALS), light-stabilizers, UV absorbers, lubricants, fatty acid esters, paraffins, blowing agents, optical brighteners, pigments, flameproofing agents, antistatics, β-aminocrotonates, phosphates, thiophosphates, gelling aids, peroxide-destroying compounds, modifiers and further complexing agents for Lewis acids.

16. A molded article comprising a stabilized PVC composition according to claim 1.

17. A molded article according to claim 15, wherein the molded article is a wire sheath, cable insulation, decorative film, foam, agricultural sheeting, tube, sealing profile or office film.

* * * * *